(12) United States Patent
Shi

(10) Patent No.: US 9,387,449 B2
(45) Date of Patent: Jul. 12, 2016

(54) CATALYTIC CRACKING METHOD AND APPARATUS

(75) Inventor: Baozhen Shi, Shandong (CN)

(73) Assignee: Baozhen Shi, Luoyang (CN)

( * ) Notice: Subject to any disclaimer, the term of this patent is extended or adjusted under 35 U.S.C. 154(b) by 510 days.

(21) Appl. No.: 13/884,803

(22) PCT Filed: Nov. 2, 2011

(86) PCT No.: PCT/CN2011/081689
§ 371 (c)(1),
(2), (4) Date: Jul. 2, 2013

(87) PCT Pub. No.: WO2012/062173
PCT Pub. Date: May 18, 2012

(65) Prior Publication Data
US 2013/0292298 A1    Nov. 7, 2013

(30) Foreign Application Priority Data

Nov. 11, 2010   (CN) ........................... 2010 1 0541483
Dec. 2, 2010    (CN) ...................... 2010 2 0640600 U

(51) Int. Cl.
*C10G 11/18*  (2006.01)
*B01J 8/24*   (2006.01)
(Continued)

(52) U.S. Cl.
CPC  *B01J 8/001* (2013.01); *B01J 8/388* (2013.01); *C10G 11/18* (2013.01); *C10G 51/026* (2013.01); *C10G 2300/4093* (2013.01)

(58) Field of Classification Search
CPC .......... B01J 8/001; B01J 8/388; C10G 11/18; C10G 2300/4093; C10G 51/026
See application file for complete search history.

(56) References Cited

U.S. PATENT DOCUMENTS 6,495,028 B1   12/2002  Xu et al.
7,220,351 B1    5/2007  Pontier et al.
(Continued)

FOREIGN PATENT DOCUMENTS

CN   1245202 A    2/2000
CN   2380297 Y    5/2000
(Continued)

OTHER PUBLICATIONS

International Search Report for Application No. PCT/CN2011/081689 mailed Feb. 23, 2012.

*Primary Examiner* — Renee E Robinson
*Assistant Examiner* — Derek Mueller
(74) *Attorney, Agent, or Firm* — Coats & Bennett, PLLC

(57) ABSTRACT

Disclosed are a catalytic cracking method and an apparatus for implementing the method. The catalytic cracking is carried out in a primary reactor and a secondary light material reactor, wherein in a first reaction region of the primary reactor, a regenerated catalyst contacts and reacts with a raw oil, the reaction mixture flows upward, and the catalyst is separated out by a separator; the separated catalyst flows to a stripping section, and the reacted oil gas flows upward along a delivery pipe and enters a second reaction region of the primary reactor; the catalyst to be regenerated from the secondary light material reactor enters the second reaction region of the primary reactor, and is mixed with the reacted oil gas from the first reaction region for further reaction; after the completion of the reaction, the oil gas is separated from the catalyst, and fed to a subsequent fractionation system, and the catalyst flows to the stripping section, is stripped together with the catalyst separated by the separator in the first reaction region, and enters a regenerator for regeneration. By using the apparatus and method disclosed herein, the production distribution and production quality are improved, the project investment is reduced, the energy consumption is lowered, and the implementation of the project is convenient.

15 Claims, 3 Drawing Sheets

(51) Int. Cl.
    *B01J 8/18* (2006.01)
    *B01J 8/00* (2006.01)
    *C10G 51/02* (2006.01)
    *B01J 8/38* (2006.01)

(56) References Cited

U.S. PATENT DOCUMENTS

| | | | |
|---|---|---|---|
| 2002/0108887 A1* | 8/2002 | Zhang | C10G 11/18 208/113 |
| 2009/0117017 A1 | 5/2009 | Long et al. | |
| 2014/0275673 A1 | 9/2014 | Long et al. | |

FOREIGN PATENT DOCUMENTS

| | | | |
|---|---|---|---|
| CN | 1302843 | A | 7/2001 |
| CN | 1340602 | A | 3/2002 |
| CN | 1861753 | A | 11/2006 |
| CN | 1912066 | A | 2/2007 |
| CN | 1912067 | A | 2/2007 |
| CN | 101045881 | A | 10/2007 |
| CN | 201901660 | U | 7/2011 |
| EP | 1046696 | A2 | 10/2000 |
| JP | S64-502199 | A | 8/1989 |
| JP | 2003517088 | A | 5/2003 |
| JP | 2007527937 | A | 10/2007 |
| WO | 8801638 | A1 | 3/1988 |
| WO | 2005085391 | A1 | 9/2005 |
| WO | 2009007519 | A2 | 1/2009 |
| WO | 2009111953 | A1 | 9/2009 |
| WO | 2009153441 | A2 | 12/2009 |
| WO | 2010101686 | A2 | 9/2010 |

* cited by examiner

CATALYTIC CRACKING METHOD AND APPARATUS

TECHNICAL FIELD

The present application relates to the field of petrochemical technology, in particular to a catalytic cracking method and apparatus for petroleum hydrocarbons feedstock.

BACKGROUND

The catalytic cracking technology is the main technology for producing gasoline, and a majority of motor gasoline in the world comes from the catalytic cracking technology; the apparatus used in the conventionally catalytic cracking is a lift pipe reactor.

The biggest shortcoming of the existing lift pipe reactor is that the lift pipe is too long so that the activity of the catalyst at the outlet of the lift pipe is only about one-third of the initial activity. Therefore, in the last half of the lift pipe reactor, the activity and selectivity of the catalyst have been decreased rapidly, the catalysis deteriorates, and the thermal cracking reaction and other adverse secondary reaction increase, which does not only inhibit an increase in the single pass conversion, but also result in the cracking gasoline with an olefin content of up to 45% or more, thus far from meeting the requirements of the new standard for gasoline. The selectivity of the catalyst is inevitably reduced as the activity of the catalyst deteriorates, thus the side reactions increase naturally.

To improve the single pass conversion in the catalysis, a key problem is how to enhance the activity of the catalyst in the last half of the existing lift pipe reactor.

CN99213769.1 discloses an idea for catalytic cracking including placing two sets of the same reaction-regeneration apparatuses one on top of the other such that the reaction oil gas contacts with the newly regenerated catalyst twice. Theoretically, this patent proposes a solution of improving the effective activity and selectivity of the catalyst by using a reaction apparatus in the mode of catalyst relay to enhance the catalytic cracking reaction in the conventional lift pipe. However, this patent contemplates (that is, the inventive step) placing two sets of "catalytic cracking reaction-regeneration apparatus" one on top of the other, which is technically unavailable, and has many difficulties involved in either construction and implementation or operation and use, and hence is a fundamental concept.

CN00122845.5 discloses a catalytic cracking method for hydrocarbon oil comprising the following basic concepts: providing two sets of reaction-regeneration systems in parallel with different catalysts used in the two systems, wherein the hydrocarbon oil firstly contacts and reacts with the cracking catalyst in the first set of reaction-regeneration system, the oil gas thus produced is fed to the second parallel set of reaction-regeneration system and contacts and reacts with the catalyst containing high silica zeolite of five-membered ring, and then the oil gas thus produced is sent to a fractionation tower for separation. This method uses two kinds of catalysts and two sets of reaction-regeneration systems, resulting in a complicated system and increased investment. Except the use of two catalysts, this patent is substantially the same as CN99213769.1 in the technology concept; there is no change in reaction and separation section between this patent and the prior art, and this patent is still in the stage of "fundamental concept" without implementation measures in each section.

CN00134054.9 discloses a catalytic cracking technology using a two-stage lift pipe in which the lift pipe is divided into an upper stage and a lower stage, wherein the catalyst in the first stage comes from the regenerator, and the catalyst and the oil gas are separated by an intermediate separator provided at the end of the first stage with only the oil gas continuing to enter the second stage of the lift pipe for reaction when the reaction in the first stage is completed; the catalyst in the second stage of the lift pipe is a regenerated catalyst from the regenerator which has been cooled using an external cooler. This technology is to allow a high active and low-temperature regenerated catalyst which has been cooled to continue to contact and react with the oil gas in the second stage of the lift pipe so as to improve the activity of the catalyst in the second stage of the lift pipe, thus increasing the single pass conversion. However, this technology has the following problems: (1) there lacks definite technical features in the key technical aspects such as the intermediate separator, and it can be known from the Examples and Figures thereof that the intermediate separator is obviously a settler in the conventional technology, and moreover the reaction oil gas after completion of the reaction in the first stage is in an environment completely without the catalyst for a long time; (2) the regenerated catalyst to be fed into the second stage of the lift pipe must be delivered by a deliver medium into the second stage of the lift pipe, and the deliver height is large, it can be easily known according to the knowledge of air conveying that there will be an increase in energy and material consumption as the required amount of the deliver medium is large; (3) the above deliver medium used for delivering the regenerated catalyst will enter the second stage of the lift pipe wholly to participate in the reaction, thus inevitably affecting the reaction conditions and reaction process in the second stage of the lift pipe. In addition, the technology substantially uses two settlers and two stripping sections, leading to a significant increase in investment.

SUMMARY

The present application discloses a catalytic cracking method by which the production distribution and production quality are improved, the project investment is reduced, the energy consumption is lowered, and the implementation of the project is convenient; the disclosure also provides an apparatus used for implementing the method.

In one aspect, the present application discloses a catalytic cracking method comprising:

providing a catalytic cracking primary reactor, a secondary light material reactor, and a catalyst regenerator, wherein the catalytic cracking primary reactor is at least provided with a first reaction region, a delivery pipe, and a second reaction region from bottom to top; the first reaction region is separated from the delivery pipe with a catalyst separator provided on the outlet of the first reaction region; a catalyst passage is provided between the delivery pipe and the second reaction region; the primary reactor, a settler, and a stripping section are arranged jointly up and down; the settler is separated from the stripping section by an upper and a lower partitions to form a catalyst supplement region in which the catalyst passage is positioned;

in the first reaction region of the catalytic cracking primary reactor, a raw oil contacts and reacts with the regenerated catalyst from the regenerator, the produced reaction oil gas and the reacted catalyst flows upward and enters the separator; the separated catalyst flows to the stripping section, while the reaction oil gas flows upward along the delivery pipe and enters the second reaction region of the primary reactor;

in the secondary light material reactor, a light material contacts and reacts with the regenerated catalyst from the regenerator under the action of a lifting medium, and then the reaction mixture flows upward along the reactor, and at the middle portion of the secondary light material reactor, a part of the catalyst to be regenerated, which has been subjected to the reaction and is still active, is directed from the secondary light material reactor into the second reaction region of the catalytic cracking primary reactor; or, a gas-solid separation may be carried out at the outlet of the secondary light material reactor, and then the separated catalyst to be regenerated is used for the reaction in the second reaction region of the primary reactor;

in the second reaction region of the catalytic cracking primary reactor, the catalyst to be regenerated from the secondary light material reactor is mixed with the reaction oil gas from the first reaction region for further reaction; after the completion of the reaction, the oil gas is separated from the catalyst in the settler, and fed to a subsequent fractionation system via an oil gas outlet pipe, and the catalyst flows to the stripping section to be stripped together with the catalyst separated by the separator in the first reaction region, and enters the regenerator for regeneration.

Further, in the above catalytic cracking method, the reaction mixture in the first reaction region of the primary reactor flows upward and has all of the catalyst separated out by the separator; or, the reaction mixture in the first reaction region of the primary reactor flows upward and has 40-90% of the total catalyst separated out by the separator.

Further, in the above catalytic cracking method, 50-100% of the catalyst to be regenerated is separated from the secondary light material reactor, and then used for the reaction in the second reaction region of the primary reactor.

More specifically, the catalyst separated from the secondary light material reactor can be delivered under gravity to the catalyst supplement region of the primary reactor via the catalyst relay pipe, and then passes through the passage between the delivery pipe and the second reaction region to the second reaction region. The amount of the catalyst to be regenerated in the secondary reactor which is used for the reaction in the second reaction region of the primary reactor can be controlled by adjusting the opening of the slide valve mounted on the relay pipe. The reaction oil gas from the secondary light material reactor can be mixed with the reaction oil gas from the primary reactor before entering the fractionation system through a common oil gas line, or it can be directed from the settler to a separate fractionation system by a separate oil gas line. When a part of the catalyst separated from the middle portion of the secondary light material reactor is used for the second reaction region of the primary reactor, the rest of the catalyst and the oil gas are subjected to a gas-solid separation at the outlet of the secondary light material reactor.

In the above catalytic cracking method, in some embodiments, the first reaction region, the delivery pipe, and the second reaction region of the catalytic cracking primary reactor are arranged coaxially.

In the above catalytic cracking method, further, the regenerated catalyst from the regenerator is cooled before entering the primary reactor.

In the above catalytic cracking method, further, the catalyst to be regenerated, which has been subjected to the reaction in the secondary light material reactor, is partly refluxed to a pre-lifting section positioned at the bottom of the secondary light material reactor.

In the above catalytic cracking method, further, the reaction oil gas and the catalyst, which have been subjected to the catalytic cracking reaction in the secondary light material reactor, are subjected to the catalyst separation by an individual gas-solid separation system, and the oil gas enters an individual fractionation system.

In another aspect, the present disclosure also provides a catalytic cracking apparatus including a primary reactor, which is at least provided with a first reaction region, a delivery pipe and a second reaction region from bottom to top, and a secondary light material reactor, wherein the first reaction region is separated from the delivery pipe with a catalyst separator provided on the outlet of the first reaction region; a catalyst passage is provided between the delivery pipe and the second reaction region; the settler is separated from the stripping section by an upper and a lower partitions to form the catalyst supplement region in which the catalyst passage is positioned; the primary reactor, together with a settler, a catalyst supplement region and a stripping section are arranged jointly up and down; a catalyst relay pipe is provided between the catalyst supplement region and the secondary light material reactor; a catalyst reflux pipe is provided between the settler and the stripping section (for the separated catalyst to directly flow to the stripping section under gravity); the settler is provided with an oil gas outlet pipe.

According to one embodiment, the first and second reaction regions are in the form of a lift pipe.

Further, the secondary light material reactor is provided at its outlet with a second settler, which is provided with a second oil gas outlet pipe for separately extracting the reaction oil gas from the secondary reactor; or the secondary light material reactor and the primary reactor share the settler, in which a two-stage gas-solid cyclone separator positioned at the outlet of the secondary light material reactor and a second oil gas outlet pipe are provided for separately extracting the reaction oil gas from the secondary reactor; or the secondary light material reactor and the primary reactor share the settler, and the two reactors share a gas-solid cyclone separator positioned at the outlet and the oil gas outlet pipe, to extract the mixed oil gas from the two reactors.

Still further, the catalyst relay pipe communicates with the catalyst supplement region on one end thereof and communicates with the secondary light material reactor or the second settler on the other end thereof so as to introduce the catalyst to be regenerated from the secondary light material reactor into the catalyst supplement region; a slide valve is provided on the catalyst relay pipe to control the amount of the catalyst to be regenerated which is supplemented into the catalyst supplement region by adjusting the opening of the slide valve.

In addition, a catalyst cooler is provided on the regeneration line communicating with the pre-lifting section positioned at the bottom of the primary reactor, for cooling down the regenerated catalyst to be fed into the pre-lifting section.

Further, the secondary light material reactor is provided with a catalyst reflux pipe, and the lower end of the catalyst reflux pipe communicates with the pre-lifting section positioned at the bottom of the secondary light material reactor; the catalyst reflux pipe is provided with a slide valve for controlling the reflux quantity of the catalyst.

Further, the partitions between the catalyst supplement region and the stripping section are partitions with holes.

In some of the embodiments:

(1) The primary reactor and the secondary light material reactor may be provided with one or more rows of feed nozzles; the primary reactor uses heavy petroleum hydrocarbon-based feedstock oil as the raw material; the raw material used in the secondary light material reactor may be light hydrocarbon-based feedstock such as mixed $C_4$ components and light gasoline, for example, light gasoline fractions having a boiling point of less than 110° C. in the gasoline product in the primary reactor;

(2) The design of the separator at the outlet of the first reaction region can achieve the control of the proportion of the catalyst to be separated;

(3) The steam and the oil gas in the stripping section, together with the oil gas and a part of the catalyst in the first reaction region, can be fed into the second reaction region via the delivery pipe;

(4) The delivery pipe and the second reaction region may not directly communicate with each other, and the disconnected region therebetween can form a catalyst passage; alternatively, the delivery pipe can communicate directly with the second reaction region, wherein the catalyst passage such as circular holes can be arranged horizontally with a uniform spacing on the wall of the communicating tube, and the catalyst to be regenerated from the secondary light material reactor which is fed to the catalyst supplement region can enter the second reaction region through the catalyst passage;

(5) The catalyst supplement region contains fluidized steam which allows the catalyst in this region to keep a fluidized state and then enters uniformly the second reaction region, thus facilitating the sufficient contact of the reaction oil gas with the catalyst;

(6) The partitions are positioned between the catalyst supplement region and the settler such that the catalyst in the settler cannot return to the catalyst supplement region;

(7) The partitions between the catalyst supplement region and the stripping section may be partitions with holes, and the design of the holes only allow a part of steam and oil gas in the stripping section and the oil gas from the first reaction region to enter the catalyst supplement region through the holes on the partitions, while the catalyst in the catalyst supplement region will not enter the stripping section;

(8) The reaction oil gas in the primary reactor and the secondary light material reactor can be mixed or treated individually depending on requirements of the project implementation;

(9) A part of the catalyst is extracted from the secondary reactor to be fed into the primary reactor and/or return to the bottom of the secondary reactor, and the amount of the catalyst to be extracted can be controlled by adjusting the opening of the corresponding slide valve mounted on the catalyst relay pipe or the catalyst reflux pipe.

In one exemplary method, the reaction process in the primary reactor is as follows: the regenerated catalyst from the regenerator enters the pre-lifting section at the bottom of the primary reactor through the regeneration standpipe, flows upward into the first reaction region under the action of the pre-lifting medium, and then contacts with the atomized heavy feedstock entering through the feed nozzle to participate in the catalytic reaction; the reaction mixture flows upward, and the catalyst separated by the separator flows directly to the stripping section, and the reaction oil gas flows upward along a delivery pipe and, together with the catalyst to be regenerated from the secondary light material reactor which is supplied from the catalyst supplement region, enters the second reaction region, where they contact, mix and continue to reaction; after the end of the reaction, the oil gas separated by the settler is fed to a subsequent fractionation system via the oil gas outlet, and the catalyst flows into the stripping section located in the lower portion of the catalyst supplement region, where the catalyst, along with the catalyst separated by the separator in the first reaction region, is stripped of the oil gas entrained therein before entering the regenerator for regeneration.

In some embodiments, the reaction process in the secondary light material reactor is as follows: a part of the regenerated catalyst enters the secondary reactor through the regeneration standpipe, flows upward under the action of a lifting medium and contacts with the atomized light material entering through the feed nozzle to participate in the catalytic reaction; the reaction mixture flows upward, and in the middle of the secondary reactor, a part of catalyst to be regenerated is separated and flows into the catalyst supplement region of the primary reactor through the catalyst relay pipe, and then it is fed into the second reaction region through the catalyst passage for participating in the reaction in the primary reactor; the rest of the reactant in the secondary light material reactor continues to flow upward along the reactor to complete the catalytic reaction of the light material; after the completion of the reaction, the oil gas and the catalyst enter the settler and have the catalyst separated, while the oil gas can be separately extracted therefrom, or can be mixed with the oil gas from the primary reactor; the catalyst is fed into the settler and flows together with the catalyst from the primary reactor into the stripping section located in the lower portion of the catalyst supplement region where it is subjected to a stripping and regeneration process.

In the case that the secondary reactor is provided separately with a second settler, the reaction mixture in the secondary reactor flows upward along the reactor and is subjected to gas-solid separation in the second settler, and the separated catalyst to be regenerated is fed into the catalyst supplement region of the primary reactor through the catalyst relay pipe and then enters the second reaction region via the catalyst passage to participate in the reaction in the primary reactor, while the reaction oil gas is extracted separately from the second oil gas outlet disposed on the second settler and is not mixed with the reaction oil gas from the primary reactor.

Some embodiments disclosed herein have at least the following beneficial effects:

(1) What is optimized is the reaction activity in the primary reactor. Relatively speaking, the primary reactor uses a heavy feedstock, and thus the catalyst deactivates rapidly and has a low activity in the second reaction region; on the contrary, the secondary light material reactor uses a light feedstock and the catalyst deactivates slowly. In one embodiment, a part of the catalyst deactivated due to coking is separated out at the outlet of the first reaction region of the primary reactor, and a highly active catalyst to be regenerated coming from the secondary light material reactor is supplemented into the second reaction region for replacement, which significantly improves the activity of the catalyst in the second reaction region, and as a whole enhances the selectivity of the catalytic reaction in the primary reactor and effectively reduces the thermal reaction and the adverse secondary reaction; in addition, there is a suitable value for the activity of the catalyst, which should not be as high as possible, and the combination of the catalysts in the two reactors would properly meet such requirement.

(2) The catalytic cracking process provided in some embodiments uses an up-and-down joint arrangement of the primary reactor, the settler, the catalyst supplement region and the stripping section, and proposes a clear technical method involving that the use in combination, control and transport of the catalysts in two reactors, thus breaking the limitation in the prior art that the separation of the catalyst could only be achieved by a "settler system", and effectively solving the technical difficulties existing in the prior art of replacing the deactivated catalyst and adding the equipment for separation and settlement while taking stripping into consideration; the separation and replacement of the deactivated catalyst as well as the stripping of the catalyst to be regenerated can be accomplished in the primary reactor independently of each other; moreover, the structure of the apparatus is arranged simply and compactly without additional occupying space due to the separation and stripping of the catalyst, thus having a significant economical efficiency.

(3) In some embodiments, the secondary reactor and the primary reactor can share a stripping section even if a second settler is provided, leading to a simple implementation of the project and a significant reduction in investment.

Description of main numerals in the Figures: 10 primary reactor; 11 first reaction region; 12 catalyst supplement region; 13 second reaction region; 14, 21 feed nozzle; 15 separator; 16 partition; 17 delivery pipe; 18 catalyst passage; 19 pre-lifting section; 20 secondary light material reactor; 22 relay pipe; 23, 31 catalyst reflux pipe; 30 settler; 32 stripping section; 33 distribution pipe; 34 standpipe to regeneration; 35 second settler; 40 regenerator; 41, 42 regeneration standpipe; 43 catalyst cooler; 50, 51, 52 oil gas outlet.

DETAILED DESCRIPTION

Hereinafter, embodiments of the invention will be described in detail in conjunction with the drawings, which is intended to provide a better understanding of the spirit and essence of the invention for the reader, and the protection scope of present invention includes, but is not limit thereto.

The First Embodiment

Figure 1:
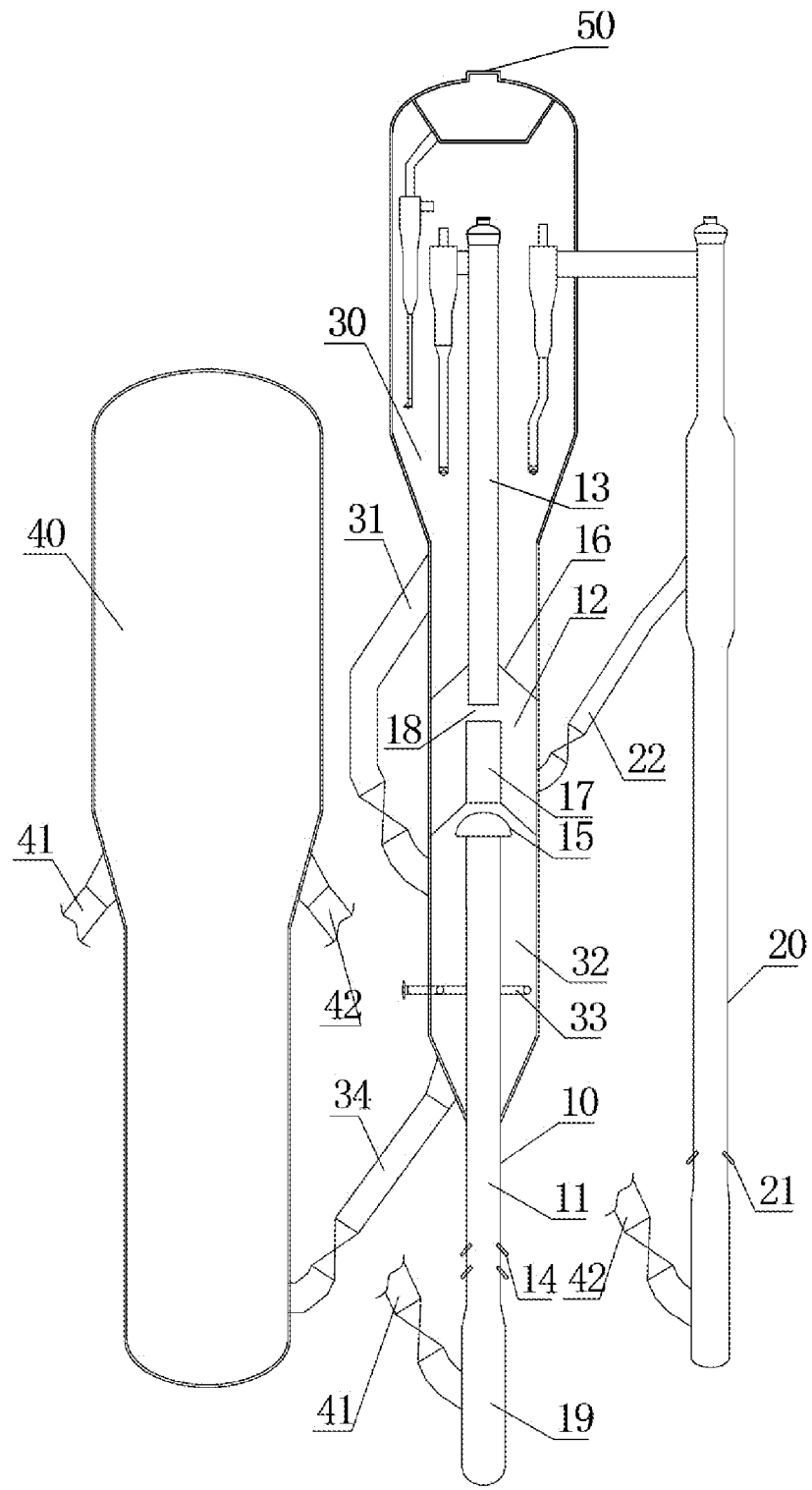
FIGS. 1-3 are schematic diagrams showing the catalytic cracking apparatus according to the methods and apparatus disclosed herein.

As shown in FIG. 1, the catalytic cracking apparatus includes a primary reactor 10 and a secondary light material reactor 20, wherein the secondary light material reactor 20 and the primary reactor 10 share a settler 30 and the gas-solid separator provided therein; the primary reactor 10 is provided with a pre-lifting section 19, a first reaction region 11, a delivery pipe 17, and a second reaction region 13 from bottom to top, with a catalyst separator 15 mounted on the outlet of the first reaction region 11; a catalyst passage 18 is provided between the delivery pipe 17 and the second reaction region 13; the settler 30 is separated from the stripping section 32 by an upper and a lower partitions 16 to form a catalyst supplement region 12 in which the catalyst passage 18 is positioned; the primary reactor 10, together with the settler 30, the catalyst supplement region 12 and the stripping section 32, are arranged jointly up and down; a catalyst relay pipe 22 is provided between the catalyst supplement region 12 and the secondary light material reactor 20; a catalyst reflux pipe 31 is provided between the settler 30 and the stripping section 32; an oil gas outlet pipe 50 shared by the two reactors is provided on the top of the settler 30.

The specific process of this embodiment is as follows:

In the secondary light material lift pipe reactor, the regenerated catalyst from the regenerator 40 enters the lower portion of the secondary light material lift pipe reactor 20 through the regeneration standpipe 42, and then flows upward under the action of the pre-lifting steam; the light gasoline is atomized by the nozzle 21 before entering the reaction region of the reactor 20, where it contacts and reacts with the above regenerated catalyst; in the middle of the reactor 20, the reacted catalyst to be regenerated is introduced from the relay pipe 22 into the catalyst supplement region 12 of the primary reactor 10, and the reaction oil gas and the remaining catalyst continue to flow upward along the reactor 20 to complete the catalytic reaction in the secondary light material lift pipe reactor 20; after the completion of the reaction, the reaction mixture is fed into the settler 30 for oil-catalyst separation.

In the primary lift pipe reactor, the regenerated catalyst from the regenerator 40 enters the pre-lifting section 19 located at the lower portion of the primary lift pipe reactor 10 through the regeneration standpipe 41, and then flows upward under the lifting action of the pre-lifting steam into the first reaction region 11 where the catalyst contacts and reacts with the heavy oil feedstock atomized by the nozzle 14; the oil gas thus generated and the reacted catalyst flow upward into the separator 15; in the separator 15, the catalyst is separated in the tangent direction by swirling gas-solid outward and then flows downward under gravity into the stripping section 32 for stripping, while the oil gas and the unseparated catalyst flows upward along the delivery pipe 17 and is fed to the second reaction region 13 through the catalyst passage 18; at this time, the catalyst to be regenerated, which is extracted from the secondary light material lift pipe reactor 20 and fed into the catalyst supplement region 12 via the relay pipe 22, is also introduced into the second reaction region 13 through the catalyst passage 18; the two streams contact and mix with each other in the second reaction region 13 for further reaction to complete the catalytic reaction in the primary reactor 10; after the completion of the reaction, the reaction mixture is fed into the settler 30 for oil-catalyst separation, and the separated catalyst is mixed with the catalyst separated after the reaction in the secondary light material lift pipe reactor 20, and they are fed into the stripping section 32 through the catalyst reflux pipe 31, mixed with the catalyst which is separated by the separator 15 and fed into the stripping section 32, and stripped under the stripping stream introduced from the distribution pipe 33, and the stripped catalyst is introduced into the regenerator 40 for regeneration through the standpipe to regeneration 34; the reaction oil gas from the primary reactor 10 is extracted from the apparatus via oil gas outlet 50 along with the reaction oil gas from the secondary light material lift pipe reactor 20.

In this embodiment, the relay pipe 22 is provided with a gas-solid separation unit (not shown) at the position of the secondary light material lift pipe reactor 20 where an extraction is carried out (that is, the diameter enlarged section in the middle of the reactor 20). When the mixture stream of the catalyst and the reaction oil gas in the reactor 20 flow upward along the reactor 20, a part of the catalyst is separated out from the mixture stream by the gas-solid separation unit; the amount of the catalyst to be separated and extracted can be adjusted, and the separated but unextracted catalyst can be incorporated into the catalyst mixture stream and continue to flow upward when the required amount of the catalyst to be extracted is decreased; the extracted amount of the catalyst to be regenerated can be controlled by the slide valve on the catalyst relay pipe 22.

In this embodiment, as the separator 15, an existing separator can be used. According to one embodiment, the separator 15 positioned at the outlet of the first reaction region 11 of the primary reactor 10 is provided with three to seven swirl vanes therein to form a swirling region, and the proportion of the catalyst to be separated is controlled by designing the area ratio of the swirling region, thus overcoming the drawback of nonadjustable separation proportion in the conventional inertia separator such as umbrella cap. In addition, the gas-solid separation unit of the relay pipe 22 at the extracted position of the secondary light material lift pipe reactor 20 may have a structure based on the same principle as that of the separator 15.

As regards the separation and the extraction of the catalyst, the following embodiments have the same principle as that of this embodiment, and hence the description thereof will be omitted.

The Second Embodiment

Figure 2:
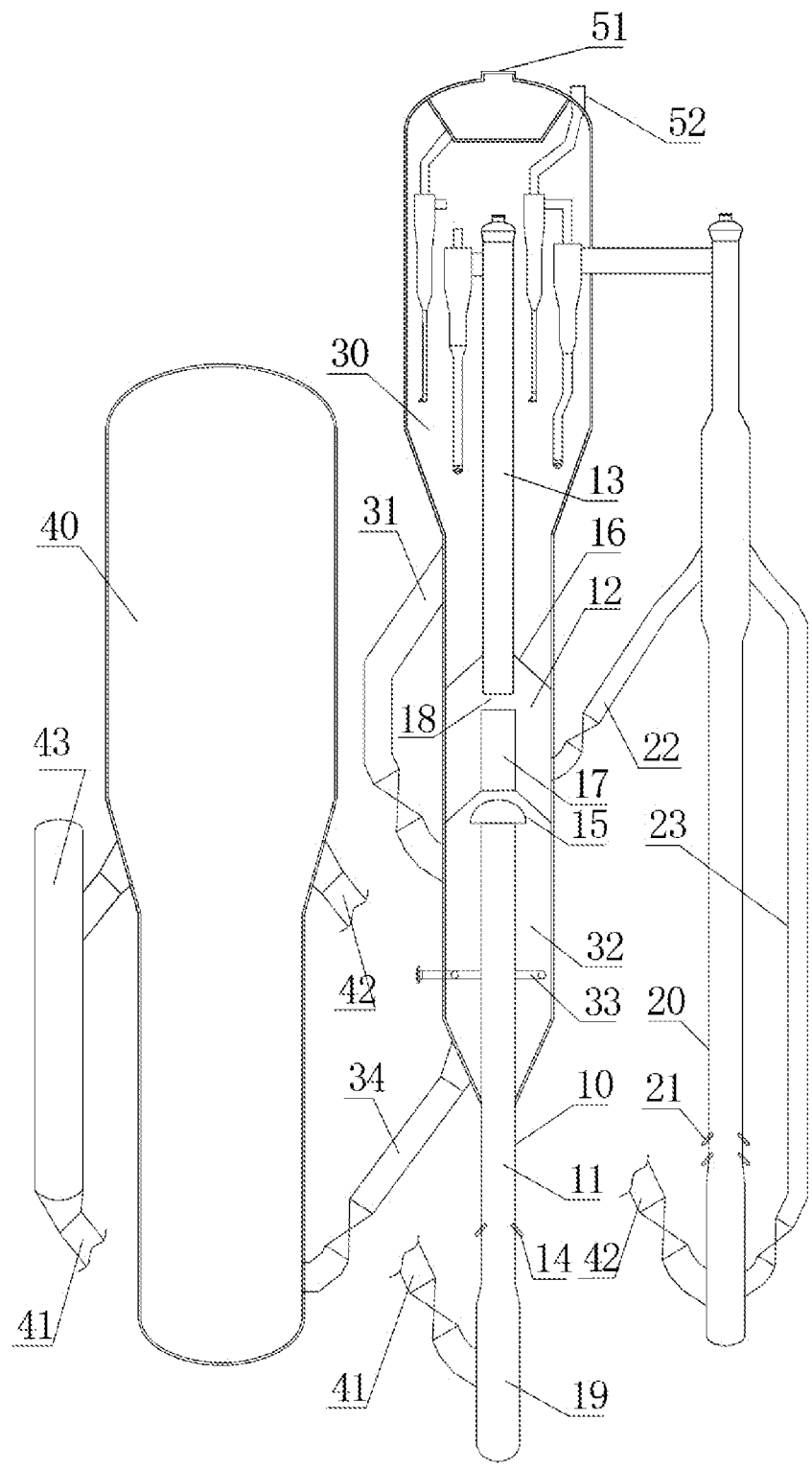

The catalytic cracking apparatus in a refinery is designed as in FIG. 2, in which the regeneration standpipe 41 is provided with a catalyst cooler 43, and the secondary light material lift pipe reactor 20 is provided with a catalyst reflux pipe 23; the reactor 20 and the primary reactor 10 have a common settler 30 but do not share a gas-solid separator, and the reaction oil gas from the two reactors are treated separately. The other portions of the apparatus have the same structure as in FIG. 1.

The Third Embodiment

Figure 3:
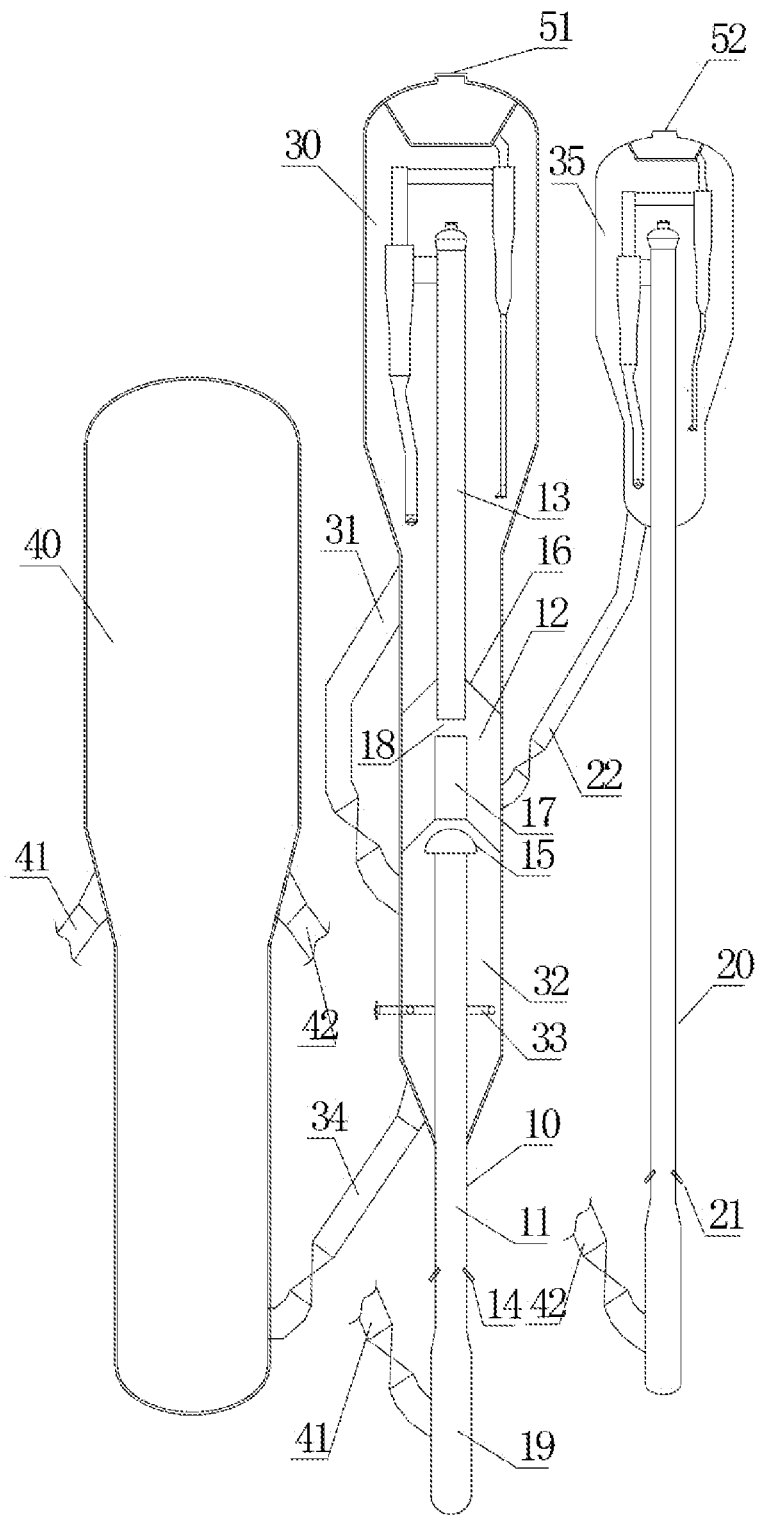

The catalytic cracking apparatus in a refinery is designed as in FIG. 3, in which a second settler 35 is provided separately at the outlet of the secondary reactor 20; the catalyst to be regenerated from the secondary reactor 20 is extracted from the second settler 35 and then fed into the second reaction region 13 through the catalyst supplement region 12; the reaction oil gas from the two reactors are treated separately. The other portions of the apparatus have the same structure as in FIG. 1.

Example 1

The catalytic cracking apparatus in a refinery is designed as in FIG. 1, wherein the heavy oil at 220° C. was atomized by the nozzle 14, fed into the first reaction region 11 of the primary lift pipe reactor 10, mixed with the regenerated catalyst at about 640° C. and gasified, and flowed upward along the first reaction region 11 for continuous reaction with a reaction period of 1.0 s at a reaction temperature of 520° C.; after the completion of the reaction, the catalyst was separated out from the mixture by the separator 15, and the oil gas flowed upward along the delivery pipe 17 into the second reaction region 13; meanwhile, the catalyst to be regenerated which had been extracted from the secondary light material lift pipe reactor 20 was fed into the catalyst supplement region 12 and then entered into the second reaction region 13 where it contacted and reacted with the reaction oil gas fed into the second reaction region 13 for continuous reaction with a reaction period of 1.5 s at a reaction temperature of 510° C.

In the secondary light material lift pipe reactor 20, the light gasoline having a boiling point of less than 85° C. which was preheated to 60-70° C. was atomized by the nozzle 21, fed into the reactor 20, and mixed with the regenerated catalyst at about 640° C. for continuous reaction with a reaction period of 2.5 s at a reaction temperature of 520° C.

After the completion of the reactions in the two reactors, the oil gas was fed into the common settler 30, and the mixed oil gas having the catalyst separated was extracted through the outlet pipe 50; the catalyst flowed into the stripping section 32 through the catalyst reflux pipe 31, and was stripped of the oil gas entrained in the catalyst and returned to the regenerator 40 for regeneration.

In this Example, the amount of the catalyst extracted from the secondary light material lift pipe reactor 20 was controlled by the slide valve on the catalyst relay pipe 22.

This Example could achieve a single pass conversion increased by 10% or more on average and a liquid yield increased by about 2%, as compared with the prior art.

Example 2

The second embodiment as described above was used. In this Example, the heavy oil raw material contacted and reacted with the regenerated catalyst at about 640° C. in the first reaction region 11; the circulation amount of the catalyst to be regenerated which was refluxed from the reactor 20 was controlled by the slide valve positioned on the catalyst reflux pipe 23 with a reflux quantity of 40%; the reaction raw material in the reactor 20 was mixed $C_4$ components. In this Example, the reaction temperature was 500° C. and the reaction period was 1.0 s in the first reaction region, and the reaction temperature was 495° C. and the reaction period was 1.5 s in the second reaction region of the lift pipe reactor 10; the reaction temperature was 510° C. and the reaction period was 2.4 s in the lift pipe reactor 20; the thermal cracking side reaction was greatly reduced in the first reaction region 11 and the secondary reactor 20, and moreover, the primary reactor could achieve a single pass conversion increased by 12% or more on average and a liquid yield increased by about 3%, as compared with the prior art.

Example 3

A catalytic cracking apparatus with a production of 1,800,000 ton per year in a refinery is as follows: the primary reactor includes the first reaction region with a diameter of 1.12 m and a height of 20.4 m, the second reaction region with a diameter of 1.12 m and a height of 13.8 m, and the catalyst supplement region with a diameter of 3.6 m, a height of 2.5 m, and an elevation of 16868 at the catalyst supplement port; the light material reactor has a diameter of 0.8 m, a height of 27.4 m, and the diameter enlarged section at the middle thereof has a diameter of 1.6 m and a height of 7.0 m, and the catalyst extraction point has an elevation of 38000; the stripping section has a diameter of 3.6 m, and a height of 8.0 m.

The heavy petroleum hydrocarbon-based feedstock oil at 220° C. was fed into the first reaction region of the primary reactor, contacted and mixed with the regenerated catalyst at 640° C. to react at a catalyst-to-oil ratio of 7:1 and a reaction temperature of 520° C. for a reaction period of 1.0 s; the oil gas and the catalyst flowed upward into the separation region to separate out 76% of the catalyst to be regenerated, and the oil gas and the rest of the catalyst were fed into the second reaction region; meanwhile, in the secondary reactor, the light gasoline having a boiling point of less than 85° C. which was preheated to 70° C. was contacted and mixed with the regenerated catalyst at 640° C. to react at a catalyst-to-oil ratio of 14:1 and a reaction temperature of 520° C. for a reaction period of 2.5 s, and 90% of the catalyst to be regenerated was separated out and supplied into the second reaction region through the supplement region; the above reactant stream fed into the second reaction region was reacted at a catalyst-to-oil ratio of 5:1 and a reaction temperature of 510° C. for a reaction period of 1.5 s; the pressure at the top of the settler was 0.26 MPa, and the material in the second reaction region of the primary reactor was extracted from the reactor and subjected to the cyclone separation in the settler; then, the oil gas was fed into the fractionation system, where the light gasoline fraction at less than 85° C. was introduced into the secondary reactor for reaction, while the catalyst to be regenerated flowed into the stripping section and was stripped together with the catalyst separated from the outlet of the first reaction region, and then entered the regenerator for regeneration. The reaction oil gas in the secondary light material reactor 20 and the oil gas in the primary reactor were treated separately.

The main properties of the heavy feedstock oil were shown in Table 1, and a distillate oil blended with 12% of vacuum residue oil was used as the heavy feedstock oil; a product of light gasoline fractions was used as the feedstock oil in the secondary reactor; the catalyst used was CC-20DF equilibrium catalyst having an activity of 65.4. The main reaction conditions were listed in Table 2, and the product distributions in the results of implementation were listed in Table 3.

Comparative Example 1

Change in the Apparatus as Compared with the Existing Heavy Oil Lift Pipe Technology The heavy feedstock oil and the catalyst used in the primary reactor in Example 3 are used; however, in Comparative Example 1, the reactor as used is a conventional FCC apparatus without a secondary reactor, and the primary reactor is provided with only one reaction region, without a second reaction region and the catalyst supplement region. The reaction conditions are the same as in Example 3.

The reaction process in Comparative Example 1 is as follows: the feedstock oil was preheated to 220° C., steam atomized, fed into the lower portion of the reactor, and contacted and reacted with the regenerated catalyst of 640° C. at a reaction temperature of 520° C. for a reaction period of 2.5 s; after the completion of the reaction, the oil gas was separated from the catalyst, wherein the oil gas was fed into the fractionation system to be separated into various products, and the catalyst was stripped and then subjected to a coke-burning regeneration in the regenerator before returning to the reactor for reuse.

The main reaction conditions were listed in Table 2, and the product distributions in the results of this implementation were listed in Table 3.

As can be seen from the production distribution shown in Table 3, Example 3 can substantially increase the conversion level of the feedstock in a heavy material lift pipe, increase the throughput by up to 20.5%, significantly improve the product distribution, achieve an increase of light product yield by 3% or more, greatly reduce dry gas and coke, and markedly enhance the product quality with a reduction by 12% in the gasoline olefin content, as compared with Comparative Example 1.

TABLE 1

Main properties of the heavy feedstock oil in Example 3

| Item | feedstock oil |
|---|---|
| Density, 20° C., kg/m$^3$ | 936 |
| Carbon residue, w % | 4.6 |
| Hydrogen, w % | 12.1 |
| Saturated hydrocarbon, w % | 39.5 |
| Aromatics, w % | 47.3 |

TABLE 2

Main reaction conditions in Example 3 and Comparative Example 1

| Reaction conditions | Comparative Example 1 | Example 3 |
|---|---|---|
| Activity of the catalyst | 65.4 | 65.4 |
| Processing capacity of the apparatus, t/h | 205 | 246 |
| *The first reaction region of the primary reactor* | | |
| Temperature, ° C. | 520 | 520 |
| Reaction period, s | 2.5 | 1.0 |
| Catalyst-to-oil ratio | 7.0 | 7.0 |
| *The second reaction region of the primary reactor* | | |
| Temperature, ° C. | — | 510 |
| Reaction period, s | — | 1.5 |
| Catalyst-to-oil ratio | — | 5.0 |
| *The secondary reactor* | | |
| Temperature, ° C. | — | 520 |
| Reaction period, s | — | 2.5 |
| Catalyst-to-oil ratio | — | 14.0 |

TABLE 3

Product distributions and gasoline properties in Example 3 and Comparative Example 1

| Item | Comparative Example 1 | Example 3 |
|---|---|---|
| *Product distribution in the primary reactor* | | |
| Dry gas + loss | 4.55 | 3.04 |
| Liquefied gas | 12.34 | 12.82 |
| Gasoline | 43.52 | 46.85 |
| Diesel oil | 29.29 | 29.19 |
| Slurry oil | 3.81 | 2.01 |
| Coke | 6.49 | 6.09 |
| Yield of light oil % | 72.81 | 76.04 |
| Total yield % | 85.15 | 88.86 |
| Conversion % | 66.92 | 68.81 |
| Gasoline olefin content/V % | 58.1 | 46.1 |
| Gasoline MON | 79.5 | 78.5 |
| *Product distribution in the secondary reactor* | | |
| Dry gas + loss | — | 1.92 |
| Liquefied gas | — | 17.04 |
| Gasoline | — | 72.44 |
| Diesel oil | — | 6.27 |
| Slurry oil | — | 0.00 |
| Coke | — | 2.32 |

Example 4

The third embodiment as described above was used. In this Example, the lift pipe reactor 20 used C$_4$ components as the reaction raw material; the reaction conditions in the lift pipe reactor 10 are as follows: the reaction temperature was 520° C. and the reaction period was 1.0 s in the first reaction region; the reaction temperature was 510° C. and the reaction period was 1.5 s in the second reaction region; the reaction temperature was 520° C. and the reaction period was 2.5 s in the lift pipe reactor 20. The properties of the feedstock oil were listed in Table 4; the catalyst used was CC-20DF with an activity of 62; 40% of the catalyst from the first reaction region was fed into the second reaction region; 100% of the catalyst from the secondary lift pipe was fed into the second reaction region of the lift pipe 10.

The main properties of the heavy feedstock oil were listed in Table 4, and the main reaction conditions and product distributions were listed in Table 5.

Comparative Example 2

Change in the Whole Apparatus as Compared with the Existing Dual Lift Pipe Technology A dual lift pipe apparatus including a heavy oil lift pipe and a light oil lift pipe, which used the heavy feedstock oil in the primary reactor and the light feedstock oil in the secondary reactor in Example 4 as the reaction raw materials respectively, was provided. The same catalyst as in Example 4 was used, but the primary reactor was provided with only one reaction region without the second reaction region or the catalyst supplement region.

The main reaction conditions and product distributions in Comparative Example 2 were shown in Table 6.

As can be seen from the production distributions shown in Tables 5 and 6, the method according to the present disclosure can be used to substantially increase the conversion level of the feedstock used in the whole apparatus, increase the yield of gasoline+liquefied gas from 53.23% to 53.41%, achieve a total liquid yield increased from 79.01% to 81.71%, reduce the yield of dry gas and coke by approximately 2%, and significantly improve the product distribution, as compared with the conventional dual lift pipe reaction.

TABLE 4

Properties of the feedstock oil

| Item | | Feedstock oil |
|---|---|---|
| Density(20° C.), kg/m$^3$ | | 945.3 |
| Molecular weight | | 417 |
| Freezing point, ° C. | | 32 |
| Viscosity, mm$^2$/s, 100° C. | | 14.88 |
| Carbon residue, w % | | 5.15 |
| Distillation range, ° C. | IBP | 309 |
| | 10% | 389 |
| | 60% | 500 |
| Element analysis, w % | C | 85.79 |
| | H | 12.30 |
| | S | 1.0 |
| | N | 2960 |
| Group composition, w % | Saturated hydrocarbon | 52.6 |
| | Aromatics | 32.8 |
| | Gum | 12.9 |
| | Asphaltene | 1.7 |
| Meal content, μg/g | Ni | 7.0 |
| | V | 5.6 |
| | Fe | 3.0 |
| | Na | 1.0 |
| | Cu | 0.1 |
| | Ca | 3.0 |

TABLE 5

Main reaction conditions and product distribution in Example 4

Catalyst name
CC-20DF
Catalyst MA
62

| | reactor | Heavy oil | Light oil | Whole apparatus |
|---|---|---|---|---|
| Main operation conditions | Processing capacity, ten-thousand tons per year | 100 | 33.75 | |
| | Reaction temperature, ° C. | the first region 520, the second region 510 | 520 | |
| | Temperature of the regenerated catalyst, ° C. | 690 | 690 | |
| | Preheating temperature of the raw material, ° C. | 220 | 120 | |
| | Reaction pressure, (gauge pressure) MPa | 0.2 | 0.21 | |
| | Amount of atomized water steam, w % | 6 | 1 | |
| | Catalyst-to-oil ratio (relative to the fresh feedstock) | the first region 9.0, the second region 6.8 | 13.0 | |
| | Temperature of the mixed catalyst at the bottom of the heavy oil lift pipe, ° C. | 650 | 620 | |
| | Reaction period, s | the first region 1.5, the second region 1.5 | 2.5 | |
| Product distribution w % | Dry gas | 2.92 | 1.76 | 3.51 |
| | Liquefied gas | 15.0 | 15.74 | 20.31 |
| | Gasoline (<205° C.) | 41.7 | 74.50 | 33.1 |
| | Diesel oil (205° C.~350° C.) | 26.28 | 6.00 | 28.3 |
| | Slurry oil | 5.0 | 0.00 | 5.0 |
| | Coke | 8.6 | 2.00 | 9.28 |
| | Loss | 0.50 | 0.00 | 0.50 |
| | Total | 100.00 | 100.00 | 100.00 |
| yield W % | Gasoline + Liquefied gas | 56.7 | 89.74 | 53.41 |
| | Total liquid yield | 82.98 | 95.74 | 81.71 |
| | Olefin in gasoline v % | 35 | 6.0 | 16.1 |

TABLE 6

Main reaction conditions and product distribution in Comparative Example 2

| | | Catalyst name CC-20DF Catalyst MA 62 | | |
|---|---|---|---|---|
| | reactor | Heavy oil | Light oil | Whole apparatus |
| Main operation conditions | Processing capacity, ten-thousand tons per year | 100 | 33.75 | |
| | Reaction temperature, °C. | 520 | 550 | |
| | Temperature of the regenerated catalyst, °C. | 690 | 690 | |
| | Preheating temperature of the raw material, °C. | 220 | 120 | |
| | Reaction pressure, (gauge pressure) MPa | 0.20 | 0.21 | |
| | Amount of atomized water steam, w % | 6 | 1 | |
| | Catalyst-to-oil ratio (relative to the fresh feedstock) | 10.0 | 9.5 | |
| | Temperature of the mixed catalyst at the bottom of the heavy oil lift pipe, °C. | 640 | 685 | |
| | Reaction period, s | 3.3 | 3.1 | |
| Product distribution w % | Dry gas | 3.78 | 2.17 | 4.51 |
| | Liquefied gas | 16.3 | 17.0 | 22.04 |
| | Gasoline (<205° C.) | 40.2 | 73.34 | 31.19 |
| | Diesel oil (205° C.~350° C.) | 23.92 | 5.50 | 25.78 |
| | Slurry oil | 6.00 | 0.00 | 6.00 |
| | Coke | 9.30 | 2.00 | 9.98 |
| | Loss | 0.50 | 0.00 | 0.50 |
| | Total | 100.00 | 100.00 | 100.00 |
| yield W % | Gasoline + Liquefied gas | 56.5 | 90.34 | 53.23 |
| | Total liquid yield | 80.42 | 95.84 | 79.01 |
| | Olefin in gasoline v % | 35 | 6.0 | 16.5 |

Finally, it should be noted that the above description has been provided for illustrating only rather than limiting the invention. Although the invention is described in detail by referring to the embodiments thereof, it should be appreciated by a person skilled in the art that modifications or equivalent substitutions can be made to the invention without departing from the spirit and scope of the invention, and fall into the protection scope of the invention.

The invention claimed is:

1. In a catalytic cracking apparatus comprising a catalytic cracking primary reactor, a secondary light material reactor, and a catalyst regenerator, wherein the catalytic cracking primary reactor is at least provided with a first reaction region, a delivery pipe, and a second reaction region from bottom to top, wherein the first reaction region is separated from the delivery pipe with a catalyst separator provided on the outlet of the first reaction region, wherein a catalyst passage is provided between the delivery pipe and the second reaction region, and wherein the primary reactor, a settler, and a stripping section are arranged vertically and the settler is separated from the stripping section by upper and lower partitions to form a catalyst supplement region in which the catalyst passage is positioned, a catalytic cracking method comprising:

carrying out a reaction between raw oil and a regenerated catalyst from the regenerator in the first reaction region of the catalytic cracking primary reactor, wherein the raw oil and the regenerated catalyst form a first reaction mixture and wherein the first reaction mixture flows upward into the catalyst separator;

separating the catalyst from the first reaction mixture in the catalyst separator, wherein the separated catalyst flows directly to the stripping section and wherein oil gas that remains in the first reaction mixture flows upward along the delivery pipe and enters the second reaction region of the catalytic cracking primary reactor;

carrying out a reaction between a light material and the regenerated catalyst from the regenerator in the secondary light material reactor under the action of a lifting medium, wherein the light material and the regenerated catalyst form a second reaction mixture, wherein the second reaction mixture flows upward along the secondary light material reactor, wherein at the middle portion of the secondary light material reactor, a part of the regenerated catalyst that has been subjected to the reaction and is still active is directed into the second reaction region of the catalytic cracking primary reactor for use in the second reaction region of the primary reactor, either directly from the secondary light material reactor or via a gas-solid separation that is carried out at the outlet of the secondary light material reactor; and mixing the regenerated catalyst from the secondary light material reactor with the oil gas from the first reaction region in the second reaction region of the catalytic cracking primary reactor;

carrying out a reaction between the regenerated catalyst and the oil gas in the second reaction region of the catalytic cracking primary reactor, wherein after the reaction the oil gas is separated from the catalyst and fed to a subsequent fractionation system via an oil gas outlet pipe, and wherein after the reaction the catalyst flows to the stripping section to be stripped together with the catalyst separated by the separator in the first reaction region before entering the regenerator for regeneration.

2. The catalytic cracking method according to claim 1, wherein the reaction mixture in the first reaction region of the primary reactor flows upward and has all of the catalyst separated out by the separator; or, the reaction mixture in the first reaction region of the primary reactor flows upward and has 40-90% of the total catalyst separated out by the separator.

3. The catalytic cracking method according to claim 1, wherein 50-100% of the catalyst to be regenerated is separated from the secondary light material reactor, and then enters the second reaction region of the catalytic cracking primary reactor.

4. The catalytic cracking method according to claim 1, wherein the regenerated catalyst from the regenerator is cooled before entering the primary reactor.

5. The catalytic cracking method according to claim 1, wherein the catalyst to be regenerated, which has been subjected to the reaction in the secondary light material reactor, is partly refluxed to a pre-lifting section positioned at the bottom of the secondary light material reactor.

6. The catalytic cracking method according to claim 1, wherein the reaction oil gas and the catalyst, which have been subjected to the catalytic cracking reaction in the secondary light material reactor, are subjected to the catalyst separation by an individual gas-solid separation system, and the oil gas enters an individual fractionation system.

7. A catalytic cracking apparatus for implementing the catalytic cracking method according to claim 1, including:

a primary reactor, which is at least provided with a first reaction region, a delivery pipe, and a second reaction region from bottom to top;
a secondary light material reactor;
a catalyst passage;
a settler;
a catalyst supplement region;
a stripping section;
a catalyst relay pipe;
a catalyst reflux pipe; and
a catalyst regenerator;
wherein the first reaction region is separated from the delivery pipe with a catalyst separator provided on the outlet of the first reaction region; the catalyst passage is provided between the delivery pipe and the second reaction region; the primary reactor, together with the settler, the catalyst supplement region and the stripping section are arranged vertically; the settler is separated from the stripping section by upper and lower partitions to form the catalyst supplement region in which the catalyst passage is positioned; the catalyst relay pipe is provided between the catalyst supplement region and the secondary light material reactor; the catalyst reflux pipe is provided between the settler and the stripping section; the settler is provided with an oil gas outlet pipe, and
wherein the catalyst regenerator is connected to the first reaction region and the second reaction region of the primary reactor and regenerates catalyst received from the two regions.

8. The catalytic cracking apparatus according to claim 7, wherein the first and second reaction regions of the primary reactor are in the form of a lift pipe.

9. The catalytic cracking apparatus according to claim 7, wherein the first reaction region, the delivery pipe, and the second reaction region of the primary reactor are arranged coaxially.

10. The catalytic cracking apparatus according to claim 7, wherein the secondary light material reactor is provided at its outlet with a second settler, which is provided with a second oil gas outlet pipe for separately extracting the reaction oil gas from the secondary reactor; or the secondary light material reactor and the primary reactor share the settler, in which a two-stage gas-solid cyclone separator positioned at the outlet of the secondary light material reactor and a second oil gas outlet pipe are provided for separately exacting the reaction oil gas from the secondary reactor; or the secondary light material reactor and the primary reactor share the settler, and the two reactors share a gas-solid cyclone separator positioned at the outlet and the oil gas outlet pipe, to exact the mixed oil gas from the two reactors.

11. The catalytic cracking apparatus according to claim 7, wherein the catalyst relay pipe communicates with the catalyst supplement region on one end thereof and communicates with the secondary light material reactor or the second settler on the other end thereof so as to introduce the catalyst to be regenerated from the secondary light material reactor into the catalyst supplement region.

12. The catalytic cracking apparatus according to claim 7, wherein a catalyst cooler is provided on the regeneration line communicating with the pre-lifting section positioned at the bottom of the primary reactor.

13. The catalytic cracking apparatus according to claim 7, wherein a slide valve is provided on the catalyst relay pipe to control the amount of the catalyst to be regenerated which is supplemented into the catalyst supplement region by adjusting the opening of the slide valve.

14. The catalytic cracking apparatus according to claim 7, wherein the secondary light material reactor is provided with a catalyst reflux pipe, and the lower end of the catalyst reflux pipe communicates with the pre-lifting section positioned at the bottom of the secondary light material reactor; the catalyst reflux pipe is provided with a slide valve for controlling the reflux quantity of the catalyst.

15. The catalytic cracking apparatus according to claim 7, wherein the partitions between the catalyst supplement region and the stripping section are partitions with holes.

* * * * *